United States Patent [19]

Yano

[11] 3,988,753

[45] Oct. 26, 1976

[54] STROBE ADAPTER FOR USE WITH PERCUSSIVE CAMERA

[75] Inventor: Yutaka Yano, Nishinomiya, Japan

[73] Assignees: Matsushita Electric Industrial Co., Ltd., Japan

[22] Filed: Jan. 10, 1975

[21] Appl. No.: 540,250

[30] Foreign Application Priority Data

Jan. 18, 1974 Japan.................................. 49-8766

[52] U.S. Cl. .................................................. 354/141
[51] Int. Cl.² ........................................... G03B 19/02
[58] Field of Search ........... 354/145, 141, 126, 140; 240/1.3; 200/67 C

[56] References Cited
UNITED STATES PATENTS

| | | | |
|---|---|---|---|
| 1,731,612 | 10/1929 | Dunham .......................... 200/67 C |
| 3,672,813 | 6/1972 | Horton .......................... 354/141 UX |
| 3,731,605 | 5/1973 | Kitagawa ............................ 354/141 |
| 3,732,058 | 5/1973 | Ort et al. .......................... 354/141 X |
| 3,735,679 | 5/1973 | Winkler .............................. 354/141 |
| 3,833,783 | 9/1974 | Tanaka et al. ................. 200/67 C X |
| 3,852,790 | 12/1974 | Robinson ........................ 354/141 X |
| 3,882,519 | 5/1975 | Winkler et al. ..................... 354/141 |

Primary Examiner—Donald A. Griffin
Attorney, Agent, or Firm—Burgess Ryan and Wayne

[57] ABSTRACT

A strobe adapter for adapting an electrically operated strobe for use with a camera having a percussive striker comprising a lever, and a spring connected to said lever whereby said lever has a dead center position. On one side of the dead center position, one end of the lever is urged to contact the striker, and on the other side of the dead center position the other end of the lever is urged to make electrical contact with a stationary contact for energizing the strobe. A leaf spring interposed between the other end of the lever and the stationary contact breaks the electrical contact with relationship, in order to inhibit continuous short circuiting of the strobe.

5 Claims, 6 Drawing Figures

STROBE ADAPTER FOR USE WITH PERCUSSIVE CAMERA

BACKGROUND OF THE INVENTION

The present invention relates to a strobe adapter provided with not only a mechanism for flashing in synchronism with the shutter opening but also a flash delaying device capable of synchronizing the flashing of a mechanically triggered flashbulb provided for a pocket camera.

Simple pocket cameras are very convenient to carry and handle and are widely used. These cameras are provided with a striker which is pushed up or projects when a shutter release button is depressed so as to trigger a triggered type flashbulb. Since a relatively long time passes after the shutter release button has been depressed before the flashbulb ignites, it is so designed that the shutter opening is delayed until the flashbulb ignites. When a strobe is used instead of a flashbulb in such a way that a trigger circuit is closed by the striker, there exists an undesirable feature in that the strobe is flashed before the shutter is opened, because the response of the electrically actuated strobe is much faster than that of the mechanically triggered flashbulb.

The striker mechanisms for triggering the mechanically triggered flashbulbs may be divided into two types. That is, in the first type or pushing-up type the striker is pushed up substantially at the same speed with which the shutter release button is depressed, and the shutter is opened a predetermined time after the release button is depressed. In the second type or projecting type, the striker almost instantaneously projects under the force of a spring. It is clear that the speed of the pushing-up type striker is considerably slower than that of the projecting type striker. In the case of cameras using the pushing-up type striker mechanism in which the stroke of the striker is designed to be, for instance, 7 mm and the shutter is designed to be opened when the striker is pushed up, for instance, 4 mm, it very frequently occurs that the shutter is opened when the striker is pushed up 5 or 6 mm depending upon the pressure applied to the release button. In other words, the shutter opening timing varies depending upon the pressure applied to the release button.

SUMMARY OF THE INVENTION

In view of the above, one of the objects of the present invention is to provide a strobe adapter which ensures the correct shutter opening timing regardless of the depressing pressure applied to the release button.

Another object of the present invention is to provide a strobe adapter which may be actuated by both the pushing-up type and projecting type striker mechanisms.

A further object of the present invention is to provide a strobe adapter which is compact in size, simple in construction, and inexpensive to manufacture.

Briefly stated, in the strobe adapter in accordance with the present invention, a spring is loaded between a stationary wall and a lever in such a way that it normally biases the lever in such a direction that one end of the lever normally engages a striker. When the striker is pushed up or projected, the lever is rotated, passing beyond the dead point of the spring so that a movable contact attached at the other end of the lever may contact a stationary contact. That is, the dead point of the spring may be passed either by the pushing-up type striker whose stroke is relatively slow or by the projecting type striker which almost instantaneously projects when the release button is depressed. The time interval from the time when the dead point of the spring is passed to the time when the movable and stationary contacts are closed is suitably selected so that the strobe may be always and correctly flashed a predetermined time after the release button is depressed. The essential main parts of the present invention are a lever and a spring, so that the strobe adapter of the present invention may be made compact in size, simple in construction, and inexpensive to manufacture.

DESCRIPTION OF THE PREFERRED EMBODIMENT

Figure 1:
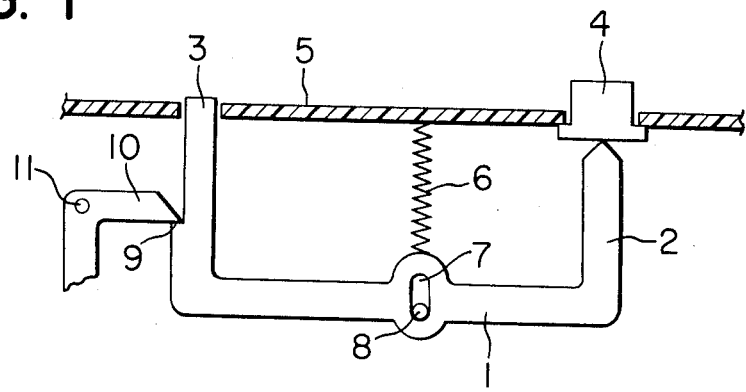
FIG. 1 is a schematic view of a pushing-up type striker mechanism.

Prior to the description of the present invention, the push-up type striker mechanism will be described with reference to FIG. 1. An arm 1 consists of a section 2 for engagement with a release button 4 fitted into a hole formed through a cover 5, and a striker 3. The arm 1 has a vertically elongated slot 7 which is formed at the center portion and into which is fitted a pin 8. A spring 6 is loaded between the center portion of the arm 1 and the cover 5. The striker 3 has a stepped portion 9 for engagement with one end of a shutter release lever 10 pivoted at 11 when a shutter is closed. When the shutter is opened, the striker 3 is released from the shutter release lever 10.

When the release button 4 is depressed, the section 2 is pushed down so that the arm 1 is swung about the stepped portion 9 which engages one end of the shutter release lever 10. As a result the energy for causing the shutter release lever 10 to open the shutter is stored in the spring 6. Thereafter, the shutter release lever 10 is released from the engagement with the stepped portion 9 of the striker 3 so that the shutter is opened. Then the striker 3 is caused to be pushed up by the spring 6, the upward stroke being substantially equal to the length of the elongated slot 7.

With the striker mechanism of the type described, the shutter opening timing varies depending upon the pressure applied to the release button 4. That is, assume that the mechanism is so designed that the stroke of the striker 3 is 7 mm and the shutter release lever 10 is released when the striker 3 is displaced by 4 mm. However, in practice the shutter is opened when the striker 3 is displaced by five or six milimeters depending upon the pressure applied to the release button 4.

The Invention

Figure 2:
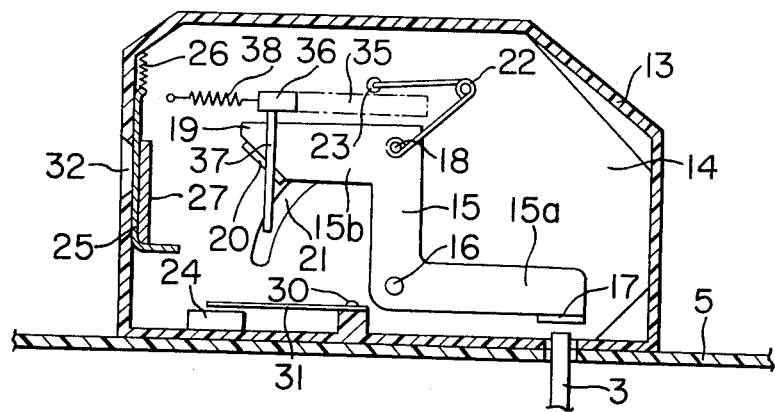
FIG. 2 is a sectional view of one preferred embodiment of the present invention.
Figure 3:
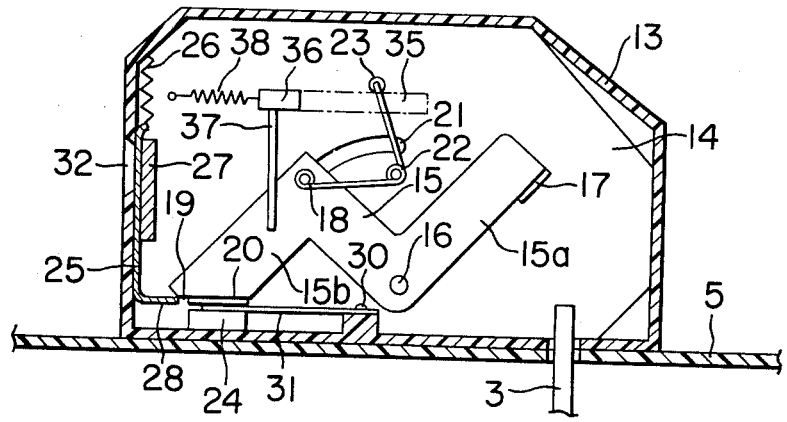
FIG. 3 is a sectional view thereof illustrating the set condition.

Referring first to FIGS. 2 and 3, a stationary wall 14 is disposed within a cover 13 of a strobe adapter 12, and the lower elbow of a Z-shaped lever 15 is pivoted with a pin 16 to stationary wall 14 at a point below its center. An engaging or impact receiving member 17 is attached to the lower side of a lower arm 15a of the lever 15 for engagement with the striker 3 shown in FIG. 1. An electric contact 20 is attached to the slanting surface of the free end 19 of the upper arm 15b of the lever 15. An engaging pin 18 extending from the upper elbow of the lever 15 is fitted into an arcuate slot 21 formed through the stationary wall 14 along the locus or path along which the pin 18 is displaced when the lever 15 is rotated about the pin 16. When the pin 18 engages the upper end of the arcuate slot 21, the engaging or impact receiving member 17 of the lever 15 is in opposed relation with the upper end of the striker 3. One end of a spring 22 is attached to the pin 18 while the other end is fitted into a hole 23 formed through the stationary wall 14. The position of the hole 23 is slightly spaced apart to the left in FIG. 2 from the line connecting between the centers of the pins 16 and 18 when the pin 18 is engaged with the upper end of the arcuate slot 21. Therefore, the pin 18 is normally pressed against the upper end of the arcuate slot 21, and when the striker 3 strikes against the engaging member 17 causing the lever 15 to rotate, the pin 18 passes beyond the dead point of the spring on the line connecting the pin 18 and the hole 23.

A stationary contact 24 is attached upon the bottom of the cover 13 in such a way that when the lever 15 is rotated as shown in FIG. 3, the movable contact 20 may contact the stationary contact 24, whereby the electronic circuit; that is, a conventional trigger circuit for a strobe may be closed to flash the strobe. The free end of a leaf spring 31 whose the other end is fixed with a screw 30 to the bottom of the cover 13 extends immediately above the stationary contact 24.

A set or reset indicating plate 25 which is vertically slidably attached to the side wall of the cover 13 in opposed relation with the free end 19 of the lever 15 is normally biased upwardly by a spring 26 so that the tongue or horizontally bent lower end 28 is in engagement with the lower end of a stopper 27. The tongue 28 extends into the path of the free end 19 of the lever 15, so that when the latter is rotated, the free end 19 engages with the tongue 28, thereby pulling down the indicating plate 25 against the spring 26.

Figure 4:
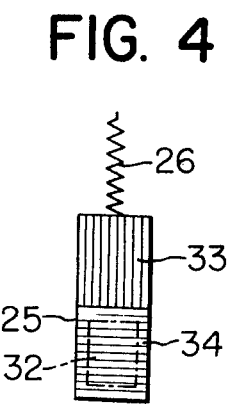
FIG. 4 is a front view of a set-reset indicating plate.

As shown in FIG. 4, the upper half of the outer surface of the indicating plate 25 is colored in red 33 while the lower half, in blue 34. An aperture or window 32 is formed through the side wall of the cover 13 in such a way that either the red or blue section of the indicating plate 25 may be viewed through the window 32. In the instant embodiment, when the red upper half 38 is seen, the strobe adapter 12 is in need of being reset while when the blue lower half 34 is viewed, the strobe adapter 12 is set.

Figure 5:
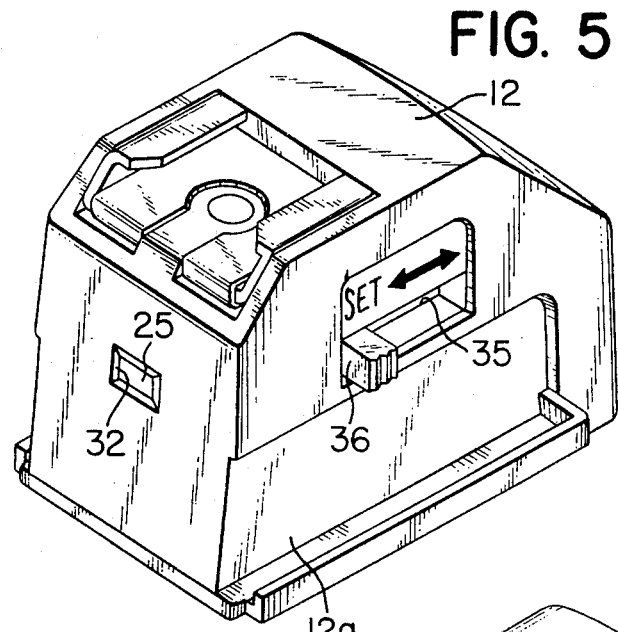
FIG. 5 is a perspective view of the preferred embodiment.

A sliding member 36 is slidably fitted into a horizontal slot 34 formed through the side wall of the cover 13 in opposed relation with the pin 18 (See FIG. 5), and has an engaging member 37 extended downwardly inside the cover 13. The slider 36 is loaded with a spring 38 so that the engaging member 37 may be normally spaced apart from the pin 18. The engaging member 37 extends into the path of the pin 18.

Figure 6:
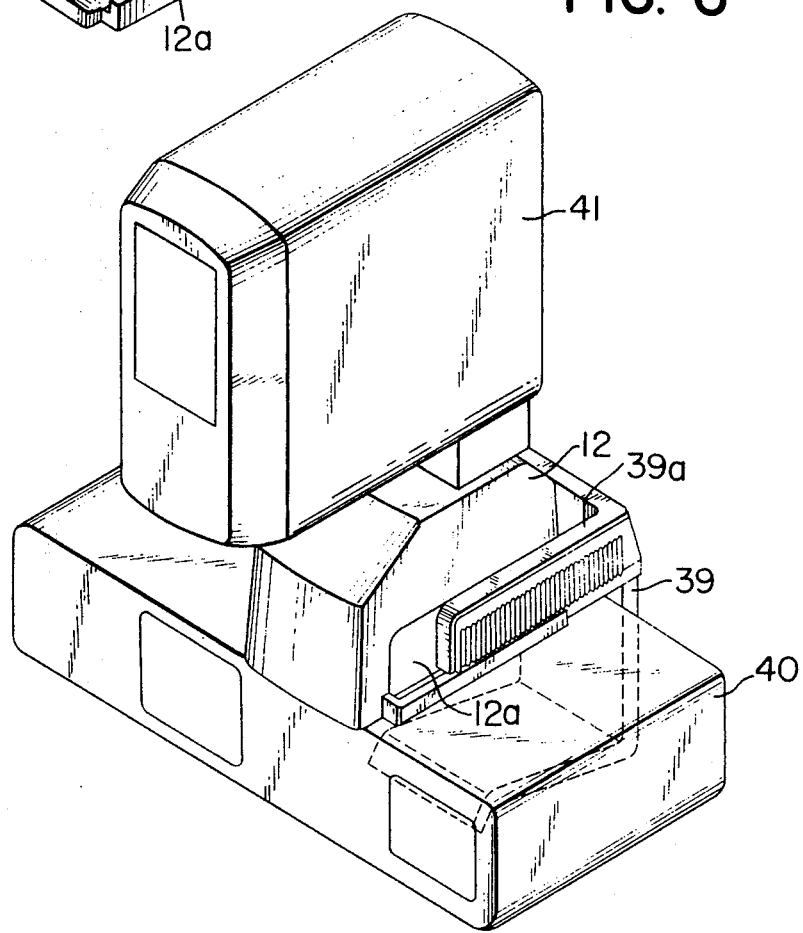
FIG. 6 is a perspective view of the strobe adapter of the present invention mounted on a pocket camera.

As shown in FIG. 6, arm 39a of a mount 39 sandwiching a pocket camera 40 is fitted into a recess 12a of the strobe adapter 12 when the latter is mounted on the camera 40, and the striker 3 of the camera 40 engages the engaging or impact receiving member 17 of the lever 15. A strobe 41 is connected to the electric contacts of the adapter 12.

Next the mode of operation will be described.

In the instant embodiment, it is assumed that the shutter release lever 10 (See FIG. 1) is released from the striker 3 when a pressure of 100 grams is applied to the release button 4 and that the force of the coiled spring 22 is so selected that when a pressure of 200 grams is applied to the shutter release button 4, the pin 18 of the lever 15 passes beyond the dead point of the coiled spring 22. It is further assumed that the spring 6 (See FIG. 1) may store the energy from 0 to 300 grams when the release button 4 is depressed.

When the pressure applied to the release button 4 reaches 150 grams, the shutter release lever 10 is to be released from the stepped portion 9 of the arm 1, but the pin 18 will not pass beyond the dead point of the coiled spring 22 as long as the pressure applied to the release button 4 does not exceed 200 grams. Consequently, the upper end of the striker 3 remains in contact with the engaging or impact receiving member 17 of the lever 15, and the pressure of 150 grams applied to the release button 4 is stored in the spring 6.

When the depressing pressure applied to the release button 4 exceeds 200 grams, the striker 3 strikes against and pushes up the engaging member 17 of the lever 15 to rotate the latter. Therefore, the engaging pin 18 passes beyond the dead point of the coiled spring 22. When the release button 4 is depressed, the shutter release lever 10 is released from the stepped portion 9 of the arm 1 so that the shutter is opened. At the same time the striker 3 pushes the engaging member 17 upwardly to rotate the lever 15 so that the engaging pin 18 passes beyond the dead point of the spring 22. Then, the lever 15 is further rotated under the force of the coiled spring 22 so that the movable contact 20 is pressed against the stationary contact 24 through the leaf spring 31 as shown in FIG. 3. Thus, the strobe 41 is flashed. It should be noted that as soon as the movable contact 20 is pressed against the stationary contact 24, it is separated therefrom under the force of the leaf spring 31 so that the trigger circuit may be prevented from being kept short-circuited.

Therefore, when the time interval from the time when the engaging pin 18 passes beyond the dead point of the coiled spring 22 to the time when the movable contact 20 engages the stationary contact 24 is so selected as to coincide with the delay time for the strobe flashing, the strobe flashing timing may be suitably timed with the shutter opening timing.

When the lever 15 is rotated, its free end 19 engages with the tongue 28 of the set-reset indicating plate 25, thereby causing the latter to displace itself downwardly so that the red colored section 33 indicating the reset condition of the strobe adapter may be seen through the window 32.

Thereafter, the engaging member 37 of the sliding member 36 causes the engaging pin 18 to move upwardly under the force of the spring 33 so that the pin 18 may pass beyond the dead point of the coiled spring 22 and may be returned to its initial position. The indicating plate 25 is returned to its initial position under the force of the spring 26 as the tongue 28 is released from the free end 19 of the lever 15, so that the blue colored section 34 indicating the reset condition of the adapter may be viewed through the window 32.

So far the strobe adapter has been described as being actuated by the pushing-up type striker, but it is to be understood that the adapter may be actuated by a projecting type striker which is instantaneously projected because the projecting energy of the latter type striker is sufficient to cause the lever 15 to rotate so that the engaging pin 18 may pass beyond the dead point of the coiled spring 22 in a manner substantially similar to that described hereinbefore.

What is claimed is:

1. A strobe adapter for adapting an electrically operated strobe for use with a camera having a striker that projects from the camera during a shutter release operation, said strobe adapter comprising
   stationary contact means,
   a lever having first and second ends,
   means pivoting said lever intermediate said first and second ends,
   first spring means connected to bias said lever whereby said lever has a dead center position, said spring means urging said one end of said lever to contact said striker on one side of said dead center position and said other end of said lever beng urged toward said stationary contact means on the other side of said dead center position,
   whereby when said striker urges said lever past its dead center position said other end of said lever is biased by said first spring means toward electrical contacting relationship with said stationary contact means for energizing said strobe, and
   second spring means mounted to urge said other end of said lever away from said stationary contact means as soon as electrical contacting relationship is established between said other end of said lever and said stationary contact means to prevent continuous short circuiting of said strobe.

2. The strobe adapter of claim 1 comprising a contact on said other end of said lever, wherein said second spring means comprises a leaf spring interposed between said contact and said stationary contact means for urging said contact away from said stationary contact means.

3. The strobe adapter of claim 1 wherein said strobe adapter comprises a stationary side wall, said lever being pivoted to said side wall, and further comprising a slot formed through said side wall, a sliding member slidably fitted into said slot and extending outwardly of said side wall, an engaging member on said sliding member, a spring connected to bias said engaging member for sliding said sliding member one direction in said slot, said engaging member being positioned to urge said one end of said lever to contact said striker when moved in the other direction in said slot, whereby said lever may be reset to engage said striker.

4. The strobe adapter of claim 1 comprising a housing for housing said lever, a window through said housing, a set-reset indicating plate slidably mounted in said housing and visible through said window from externally of said housing, spring means urging said indicating plate in one direction for indicating a set position of said strobe adapter, and means on said indicating plate positioned to be engaged by the other end of said lever when said lever is on the other side of said dead center position for urging said indicating plate to slide in a direction against the bias of said last mentioned spring means for indicating the reset position of said strobe adapter.

5. The strobe adapter of claim 1 wherein said lever is a Z-shaped lever, said means pivoting said lever comprising means pivoting said lever for rotation about the elbow thereof closest to said one end of said lever, said first spring means having a first end coupled to said lever at the other elbow thereof and a second end held in a fixed position in said strobe adapter.

* * * * *

UNITED STATES PATENT OFFICE
CERTIFICATE OF CORRECTION

Patent No. 3,988,753　　　　　　　Dated　October 26, 1976

Inventor(s)　Yutaka Yano

It is certified that error appears in the above-identified patent and that said Letters Patent are hereby corrected as shown below:

IN THE ABSTRACT: Line 12: "with" should be --in--.

COLUMN 3, Line 57: "34" should be --35--.

COLUMN 4, Line 59: "33" should be --38--.

Signed and Sealed this

Twenty-sixth Day of April 1977

[SEAL]

Attest:

RUTH C. MASON　　　　　　　　C. MARSHALL DANN
Attesting Officer　　　　Commissioner of Patents and Trademarks